United States Patent
Costello et al.

(10) Patent No.: US 11,038,591 B2
(45) Date of Patent: Jun. 15, 2021

(54) OPTICAL INTERFACE AND DISTRIBUTED FIBER OPTIC COMMUNICATION NETWORK FOR CONTROLLING A GAS TURBINE ENGINE AND METHOD

(71) Applicants: Rolls-Royce Corporation, Indianapolis, IN (US); Rolls-Royce North American Technologies Inc., Indianapolis, IN (US)

(72) Inventors: John Joseph Costello, Indianapolis, IN (US); Richard Joseph Skertic, Carmel, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 16/456,817

(22) Filed: Jun. 28, 2019

(65) Prior Publication Data
US 2020/0412453 A1    Dec. 31, 2020

(51) Int. Cl.
| | | |
|---|---|---|
| *H04B 10/2581* | (2013.01) | |
| *H04B 10/50* | (2013.01) | |
| *H04B 10/40* | (2013.01) | |
| *H04J 14/02* | (2006.01) | |
| *H04Q 11/00* | (2006.01) | |
| *B64D 31/06* | (2006.01) | |
| *B64D 27/10* | (2006.01) | |
| *F02C 9/00* | (2006.01) | |
| *H04L 29/06* | (2006.01) | |

(52) U.S. Cl.
CPC ......... *H04B 10/2581* (2013.01); *B64D 27/10* (2013.01); *B64D 31/06* (2013.01); *F02C 9/00* (2013.01); *H04B 10/40* (2013.01); *H04B 10/502* (2013.01); *H04J 14/02* (2013.01); *H04L 63/1441* (2013.01); *H04Q 11/0005* (2013.01); *H04Q 2011/0015* (2013.01); *H04Q 2011/0016* (2013.01)

(58) Field of Classification Search
None
See application file for complete search history.

(56) References Cited

U.S. PATENT DOCUMENTS 4,070,091 A    1/1978  Taylor et al.
5,261,088 A *  11/1993 Baird .................. G06F 16/9027
(Continued)

FOREIGN PATENT DOCUMENTS

WO    WO 2007/109277    9/2007

*Primary Examiner* — David W Lambert
(74) *Attorney, Agent, or Firm* — Shumaker & Sieffert, P.A.

(57) ABSTRACT

A distributed fiber optic communication network for controlling a gas turbine engine includes a computation module and an input/output (I/O) module. The computation module and the I/O module are connected via the communication network. The communication network comprises multi-mode fiber optic cables, wherein data is transferred thereon on multiple frequency bands. The frequency bands range from about 300 nm to about 1550 nm. A method of frequency hopping is provided in which communication band instructions are stored locally on nodes of the communication network and may include communication band instructions transmitted to nodes of the communication network on a dedicated band.

11 Claims, 7 Drawing Sheets

(56) References Cited

U.S. PATENT DOCUMENTS

| | | | |
|---|---|---|---|
| 5,506,445 A * | 4/1996 | Rosenberg | H01L 31/0232 |
| | | | 257/666 |
| 5,808,767 A | 9/1998 | Williams et al. | |
| 6,419,404 B1 | 7/2002 | Deri et al. | |
| 8,265,851 B2 | 9/2012 | Girouard et al. | |
| 8,576,392 B2 | 11/2013 | Johnston | |
| 8,786,857 B2 | 7/2014 | Masterson et al. | |
| 8,842,987 B2 | 9/2014 | Lee | |
| 9,055,022 B2 | 6/2015 | Ricci | |
| 9,173,100 B2 | 10/2015 | Ricci | |
| 9,705,906 B2 | 7/2017 | Mesec et al. | |
| 9,960,809 B2 | 5/2018 | Gross | |
| 2002/0054409 A1* | 5/2002 | Bartur | H04B 10/40 |
| | | | 398/139 |
| 2007/0233906 A1* | 10/2007 | Tatum | G09G 5/003 |
| | | | 710/26 |
| 2010/0274416 A1* | 10/2010 | Poisson | G05B 19/42 |
| | | | 701/3 |
| 2010/0278538 A1* | 11/2010 | Guidotti | H04B 10/803 |
| | | | 398/115 |
| 2013/0068937 A1 | 3/2013 | Ryf | |
| 2013/0315587 A1* | 11/2013 | Mukai | H04Q 11/0003 |
| | | | 398/45 |
| 2015/0226637 A1 | 8/2015 | Sanchez et al. | |
| 2015/0311981 A1* | 10/2015 | Inagaki | H04B 10/40 |
| | | | 398/135 |
| 2017/0357068 A1* | 12/2017 | Finkman | G02B 6/428 |
| 2018/0269964 A1* | 9/2018 | Mertz | G02B 6/43 |
| 2018/0295633 A1* | 10/2018 | Abdelmonem | H04W 24/06 |

\* cited by examiner

OPTICAL INTERFACE AND DISTRIBUTED FIBER OPTIC COMMUNICATION NETWORK FOR CONTROLLING A GAS TURBINE ENGINE AND METHOD

FIELD OF DISCLOSURE

The present subject matter relates generally to distributed communication networks used to control aircraft engines.

BACKGROUND

Control systems, such as engine control systems, are tightly integrated with other components that transmit or receive data. The control systems are linked to these other components by way of multiple input/output ("I/O") data connections through which the data travels. The multiple I/O data connections constrain the control systems. For example, the various interconnected components must be physically located close to each other to minimize the connection lengths of the multiple I/O data connections, such as harness lengths for harnesses that carry the multiple I/O data connections. As such, these control systems are often designed in a bespoke manner, such that they are highly customized for specific purposes.

In addition, control systems must handle high data throughput rates, and future control systems may be required to handle even higher throughput rates. For example, the processing power required for the control of complex platforms that will handle the future data throughput requirements, such as a gas turbine engine, may not be available, at least in hardened form (i.e., able to withstand the harsh operating environment associated with gas turbines). Further, currently available processors become obsolete quickly and thus require costly redesign of the control system. Moreover, entities, such as regulatory entities, are requiring control systems to provide cyber security. For example, military contracts may require control systems to be protected against cyber threats. As such, there are opportunities to improve control systems.

The current state of the art for aerospace control systems uses copper wiring harnesses for communications and to deliver power to remote electronics. Due to the performance characteristics and material properties of copper conductor wiring harnesses and the other harness materials, the harness and engine system components must go through many environmental tests to make sure the system will continue or recover from any environmental or operational event (e.g., fluid susceptibility).

SUMMARY

According to one aspect, a distributed control system for a gas turbine engine includes an input/output (I/O) module, at least one actuator, and a computation module. The I/O module is coupled to the gas turbine engine and includes a first processor and a first network interface device operably coupled to the first processor, and at least one sensor operably coupled to the I/O module configured to provide a signal to the first processor. The signal is based on sensed conditions of the gas turbine engine, and the at least one actuator is operably coupled to the I/O module and controlled by the first processor. The computation module includes a second processor with higher processing power than the first processor and a second network interface device operably coupled to the second processor, wherein the second network interface device and the first network interface device are each one of a plurality of nodes on a communication network. The communication network comprises multi-mode fiber optic cable and the communication network is configured to operate at wavelengths between about 300 nm and about 1550 nm.

According to a further aspect, a method of operating a communication network for a gas turbine engine, the method comprising: providing a first processor located within the aircraft engine and, sensing, by at least one sensor, conditions of the gas turbine engine and providing signals to a first processor, the first processor operably coupled to a first network interface device; operating a second processor that has higher processing power than the first processor, wherein a second network interface device operably coupled to the second processor, wherein the second network interface device and the first network interface device are each one of a plurality of nodes of a communication network between the first processor and the second processor, and wherein the communication network comprises multi-mode fiber optic cable; and transmitting data from the first network interface device to the second network interface device according to communication band instructions, wherein the communication band instructions comprise a listing of a plurality of bands between about 300 nm and about 1550 nm.

According to yet another aspect, a method for controlling an aircraft turbine engine, comprising: receiving, by a first processor from at least one sensor operably coupled to the first processor, sensor readings based on sensed conditions of the gas turbine engine; transmitting, by the first processor to a second processor, sensor data based on the received sensor readings, wherein the second processor has higher processing power than the first processor; transmitting, by the second processor to the first processor, actuator commands to control at least one actuator operably coupled to first processor via a communication network comprising multi-mode fiber optic cable, the communication network comprising a plurality of nodes; sensing, by the second processor, an abnormal signal characteristic; and switching to a first communication band of a plurality of communication bands, wherein the plurality of communication bands range from about 300 nm to about 1550 nm.

Other aspects and advantages will become apparent upon consideration of the following detailed description and the attached drawings wherein like numerals designate like structures throughout the specification.

DETAILED DESCRIPTION

Figure 1:
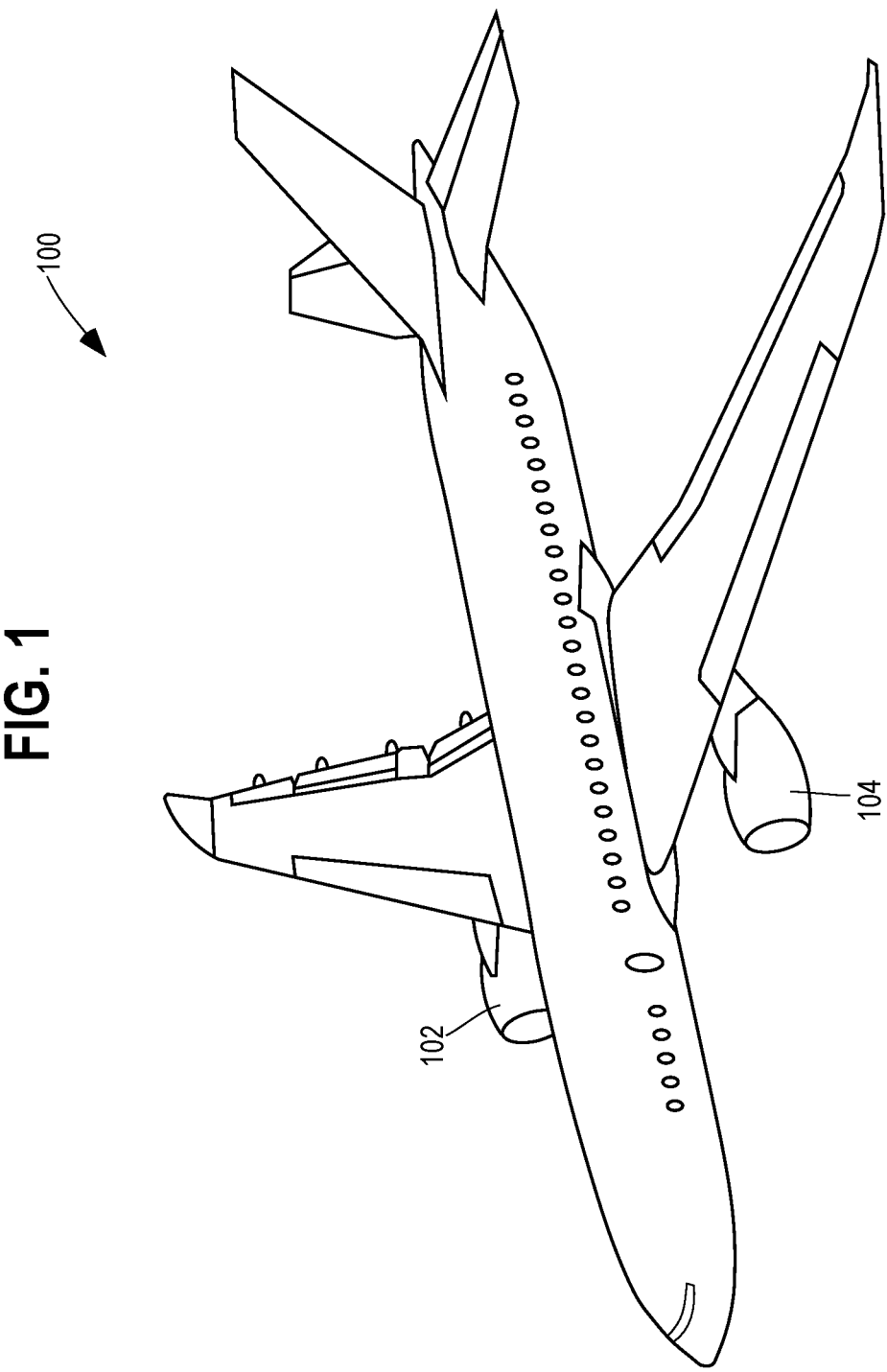
FIG. 1 is an illustration of an aircraft with engines employing an engine control system in accordance with some embodiments.

For the purposes of promoting an understanding of the principles of the disclosure, reference will now be made to a number of illustrative embodiments in the drawings and specific language will be used to describe the same.

FIG. 1 illustrates an example aircraft 100 with gas turbine engines 102, 104. Each gas turbine engine may be controlled by an engine control system, which is discussed in more detail with respect to FIG. 2.

Figure 2:
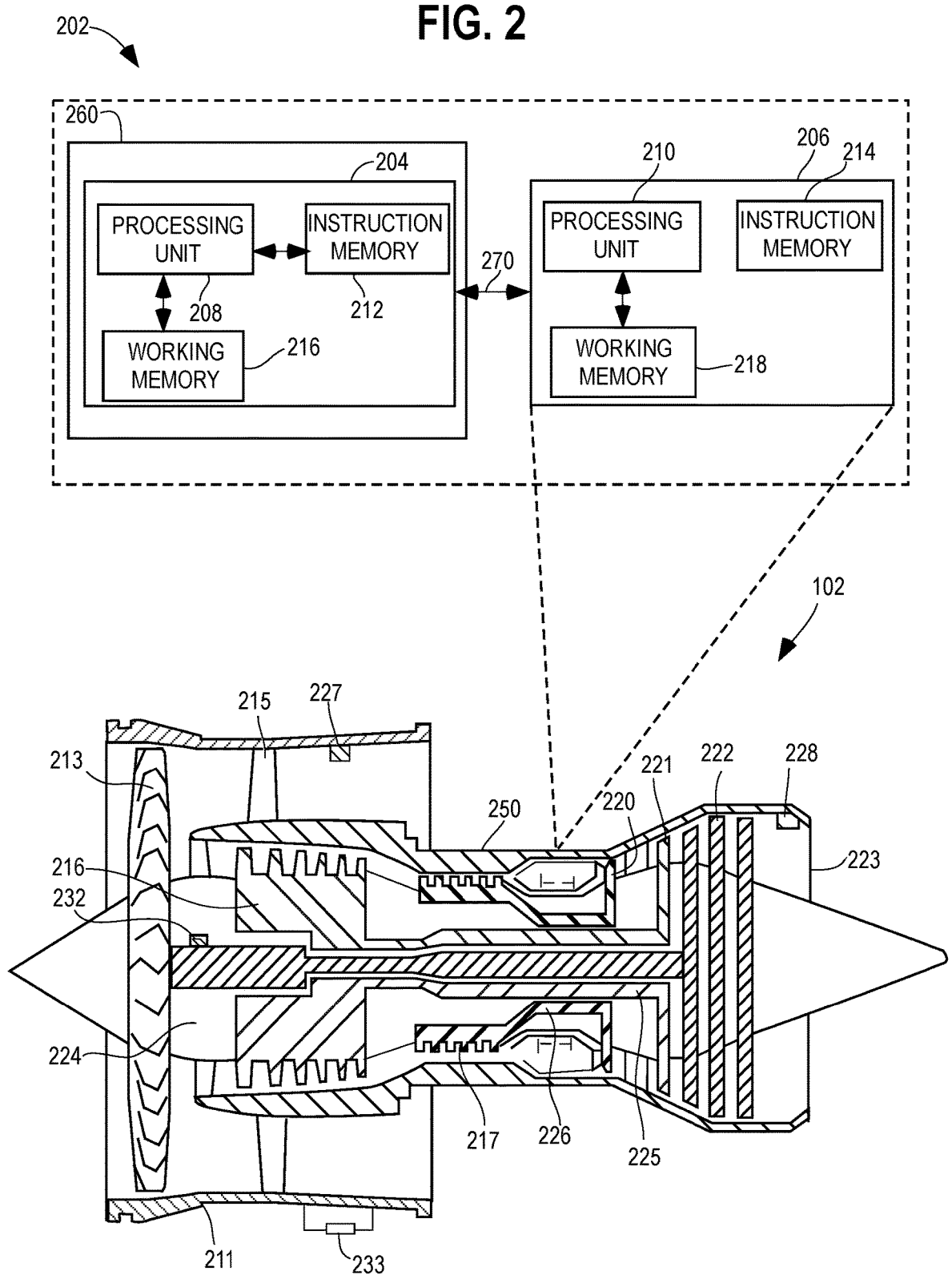
FIG. 2 is an illustration of an aircraft engine employing an engine control system in accordance with some embodiments.

FIG. 2 illustrates the gas turbine engine 102 of the example aircraft 100 of FIG. 1 in more detail. The gas turbine engine 102 includes an engine control system 202 with a distributable architecture design. As indicated in the figure, the engine control system 202 includes a computation module (CM) 204 and an input/output (I/O) module 206. Each of the computation module 204 and I/O module 206 includes electronic circuitry. The electronic circuitry may include one or more processing units 208, 210. Each of processing units 208, 210 can be, for example, a microprocessor, an execution unit or "core" on a microprocessor chip, a digital signal processor (DSP), a soft or hard core within a field-programmable gate arrays (FPGA), a processor within an application-specific integrated circuit (ASIC), a general processing unit (GPU), a commercial off the shelf (COTS) processor, or any other suitable processor.

Each of the computation module 204 and I/O module 206 may include instruction memory 212, 214, respectively. Instruction memory 212, 214 can store instructions that can be accessed (e.g., read) and executed by processing units 208, 210, respectively. For example, each of instruction memory 212, 214 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Each of the computation module 204 and I/O module 206 may also include working memory 216, 218, respectively. Processing units 208, 210 can store data to, and read data from, working memory 216, 218, respectively. For example, processing units 208, 210 can store a working set of instructions to working memory 216, 218, such as instructions loaded from instruction memory 212, 214, respectively. Processing units 208, 210 can also use working memory 208, 210, respectively, to store dynamic data.

As will discussed further below, each of the computation module 204 and the I/O module 206 are designed and configured to include the one or more processing units 208, 210 based on available locations on an engine platform, as well as on performance requirements of various control system functions. For example, while both the computation module 204 and the I/O module 206 may be located on engine platform 250, the computation module 204 may be located on or near a part of the engine platform that is subject to a more benign operating environment (proximate the cold components, e.g. inlet, fan, nacelle etc.) than the operating environment that the I/O module 206 is subject to, in general the hostility of the environment increases with proximity to the hot components (e.g. combustors, turbines, nozzle, etc.) of the engine. Each of the computation module 204 and the I/O module 206 may be assigned processing tasks in accordance with the available processing power that is available at each of the respective module's operating conditions.

FIG. 2 further illustrates, as part of gas turbine engine 102, a fan 213, a first compressor 216, a second compressor 217, turbines 220, 221, 222, propulsion nozzle 223, and fan duct 211. The fan duct 211 may be supported by guide vanes 215 extending from engine platform 250. The fan 213 is driven by a first shaft 224 connected to fan 213. First compressor 216 is driven by turbine 221 via a second shaft 225, and second compressor 217 is driven by turbine 220 via a third shaft 226. Engine control system 202 may also be communicatively coupled to one or more engine control devices 227, 228, 232, 233 such as sensors (e.g., pressure or speed transducer) or actuators. An example of an actuator is shown as 233 which controls the orientation of guide vane 215.

FIG. 2 illustrates an example of an engine control system 202 that includes a computation module 204 and I/O module 206. However, in this example, while I/O module 206 is located on engine platform 250, computation module 204 is located on off-platform 260 and the two are connected via a communication network 270. Off-platform 260 may be, for example an area that is not located on gas turbine engine 102. For example off-platform 260 may be a platform that includes third-party equipment such as a customer platform.

Figure 3:
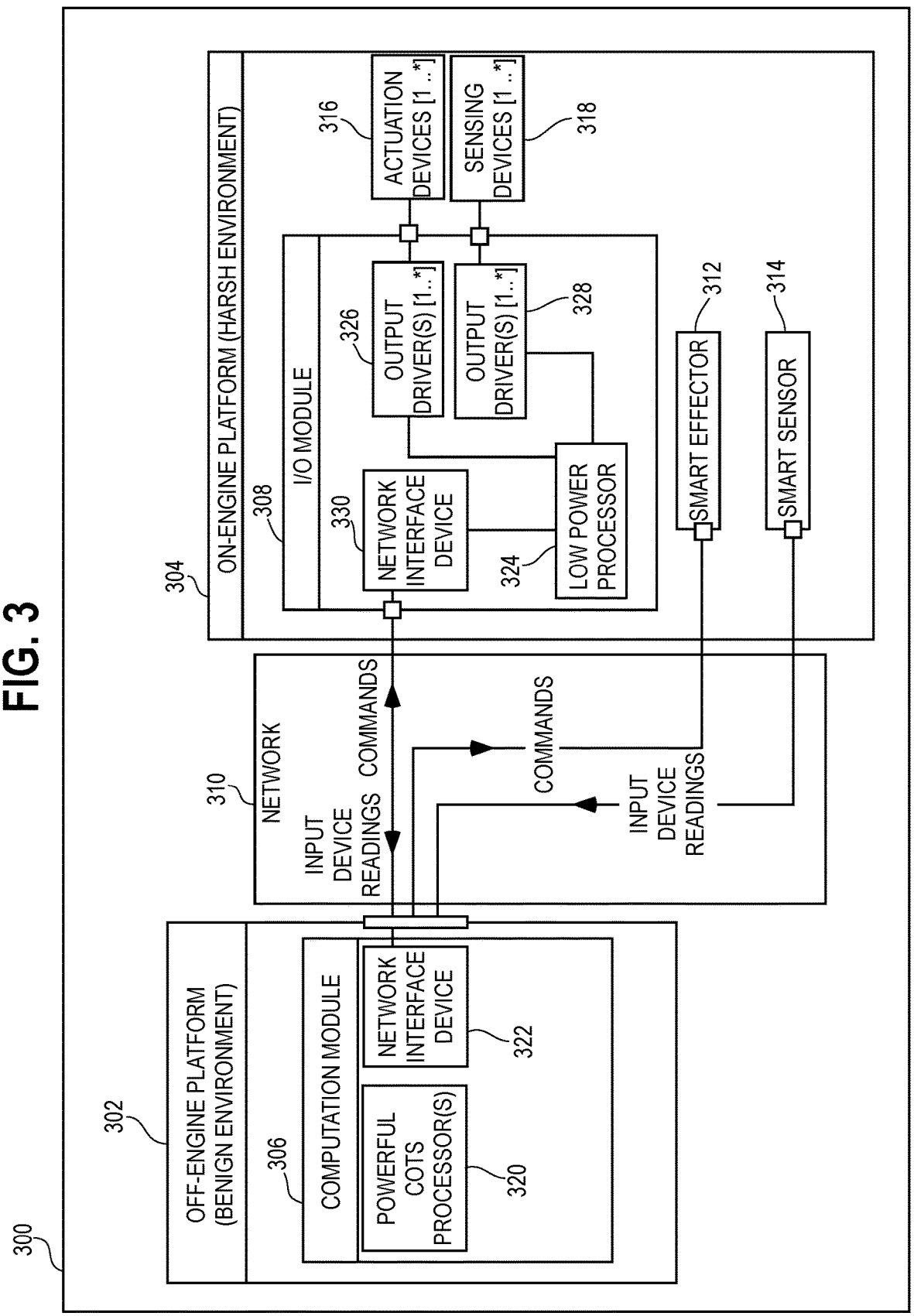
FIG. 3 is a block diagram of an engine control system in accordance with some embodiments.

FIG. 3 illustrates another block diagram of an engine control system 300 that includes an off-engine platform 302 operably coupled to an on-engine platform 304. While off-engine platform 302 includes computation module 306, on-engine platform 304 includes I/O module 308, smart effector 312, smart sensor 314, one or more actuation devices 316, and one or more sensing devices 318. In this example, computation module 306 includes one or more powerful commercial-off-the-shelf (COTS) processors 320 and a network interface device 322. Network interface device 322 provides a communication interface between one or more powerful COTS processors 320 and network 310.

Off-engine platform 302 may include hardware and/or software that allows for communication with the on-engine platform 304. In this example, computation module 306 is operably coupled to off-engine platform 302. For example, computation module 306 may send and receive messages to and from off-engine platform 302.

The location on the engine itself may be subject to widely different environments. For example, gas turbines have relatively cool areas (e.g. inlet, compressor) and hot areas (e.g. combustion chamber, turbines, exhaust). The proximity to the cool and hot areas also provides further gradation of the environment between a relative benign environment and a relatively harsh environment. Vibrational loads and temperature gradients also may be a function of the region of the engine. Harsh environments of below −55 degrees Celsius or over 125 degrees Celsius may typically preclude the use of COTS processors. In addition, COTS processors may be more susceptible to high-energy particles from space, such as what may be experienced by an airplane when flying at high altitudes.

Hence, the operating environment experienced by I/O module 308 may be harsh compared to the operating environment experienced by computation module 306. For example, I/O module 308 may experience more heat and thus hotter temperatures during operation of the engine than that experienced by computation module 306. Because these hotter temperatures may be higher than what a COTS processor is designed to operate in (e.g., 0° Celsius (C) to 85° C.), a COTS processor would be unavailable for placement on I/O module 308. In some examples, I/O module 308 may experience colder temperatures during operation of the engine than that experienced by computation module 306, where the colder temperatures may be lower than what a COTS processor is designed to operate in. As such a COTS processor would be unavailable for placement on I/O module 308 in this example as well.

I/O module 308 includes one or more low power processors 324, one or more output drivers 326, one or more input drivers 328, and a network interface device 330. In this example, I/O module 308 includes just one low power processor 324. Network interface device 330 provides a communication interface between low power processor 324 and network 310. In addition, low power processor 324 is operatively coupled to one or more output drivers 326, which may allow for the control of one or more actuation devices 316, for example. Similarly, low power processor 324 is operatively coupled to one or more input drivers 328, which allow for the reception of data from one or more sensors 318, for example.

Network 310 allows for communication between computation module 306, I/O module 308, smart effector 312, and smart sensor 314. For example, low power processor 324 may send data (e.g., device readings) from one or more sensing devices 318 to one or more powerful COTS processors 320 via network 310. Similarly, one or more powerful COTS processors 320 may send commands to one or more low power processors 324 for the control of the one or more actuation devices 316. One or more powerful COTS processors 320 may also send commands to smart effector 312 and receive data (e.g., device readings) from smart sensor 314 via network 310. Network 310 is a suitable multi-mode fiber optic network.

As indicated in the illustration, the operating environment experienced by on-engine platform 304 is harsh compared to the operating environment experienced by off-engine platform 302. For example, on-engine platform 304 may experience more heat and thus hotter temperatures during operation of the engine than that experienced by off-engine platform 302.

Furthermore, as indicated in the illustration, the operating environment experienced by on-engine platform 304 is harsh compared to the operating environment experienced by off-engine platform 302. For example, on-engine platform 304 may experience more heat and thus hotter temperatures during operation of the engine than that experienced by off-engine platform 302. Because these hotter temperatures may be higher than what a COTS processor is designed to operate in (e.g., 0° Celsius (C) to 85° C.), a COTS processor would be unavailable for placement on on-engine platform 304. The on-engine platform 304 may also be subject to more dynamic vibratory loads than an off-engine platform 302.

The distributable nature of the described architecture allows the software processing functions to be allocated to any node in the system that meets the computational prerequisites. The engine protection functions (shaft-break & overspeed detection) generally have very small performance requirements, allowing the functionality to be located in any of the modules (e.g. computational module, the I/O module, or one or more intermediate modules). Therefore, depending on the safety requirements, cybersecurity risk, and hazard assessment of the control system, it may be prudent to locate the safety functionality and/or the cybersecurity functionality within the I/O module which is closest to the relevant sensors and effectors (i.e. actuators) to prevent a network failure from disabling the engine protection features.

This control and communication system uses a broader portion of the frequency spectrum. Specifically some of the system communications can be transmitted over some of the optical and Infrared (IR) parts of the frequency spectrum. This could be expanded to include the UV band of the spectrum as well. In addition, the communication speeds within the control system can be transmitted at different speeds. For example, over the Ethernet or hardwired network, the communication speed can be in the 10 to about 100 Mbps. This is augmented by the communications over the fiber optic links that can be in the 1 to 10 Gbps communications rate.

Transitioning from traditional copper wiring harnesses to optical harnesses has many benefits over the existing communication/power networks on a propulsion system. The motivations for using fiber optics are associated with system weight reductions, improved environmental and other performance capabilities. Such as lower susceptibility to lightning and for electromagnetic compatibility, wider temperature operating capabilities, reductions in system life-cycle costs, improved data transmission, higher speed communications, higher communication bandwidth, and the ability to enable cybersecurity functionality.

Embodiments and variants presented herein address the deficiencies of the prior art. Embodiments advantageously address, safety and customer constrains, size, throughput, processing power, environment, obsolescence, development and life cycle costs, cyber security, unit cost and versatility.

The system can frequency hop the communications spectrum in a predetermined manner when a cyber attack is detected. Frequency-Hopping, Spread Spectrum (FHSS) is a method of transmitting radio signals by rapidly switching the carrier frequency among many frequency channels, using a pseudorandom sequence known to both the transmitter and receiver in the system. The overall bandwidth required for frequency hopping is much wider than that required to transmit the same information using only one carrier frequency. However, because transmission occurs only on a small portion of this signal bandwidth at any given time, the effective interference bandwidth is really the same for the system. With fiber optic communication networks this type of mitigation is currently only possible over a limited range of the optical spectrum, e.g. 1300 to 1550 nm optical signals that are transmitted with the same optoelectronics hardware.

Figure 4:
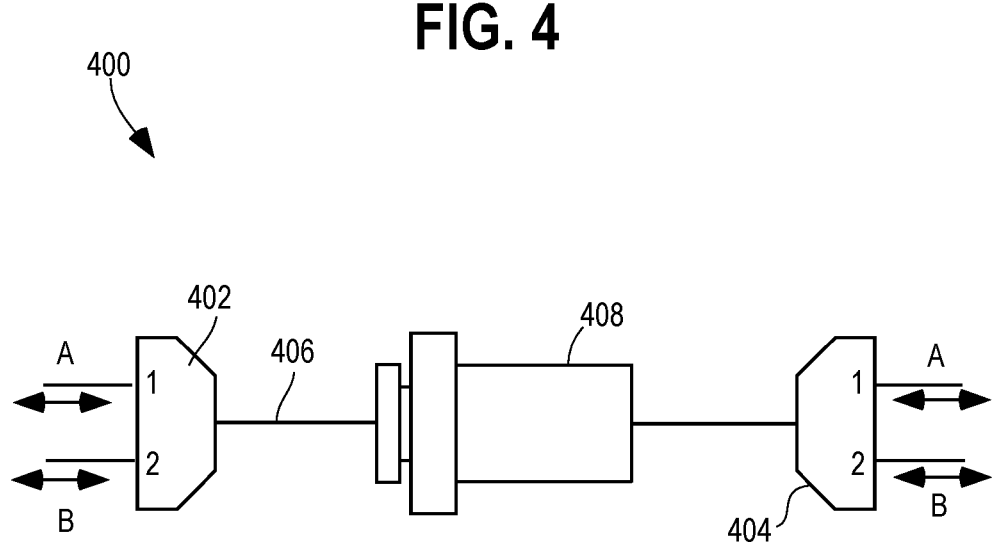
FIG. 4 is a diagram of a fiber optic assembly comprising wavelength division multiplexers.
Figure 5:
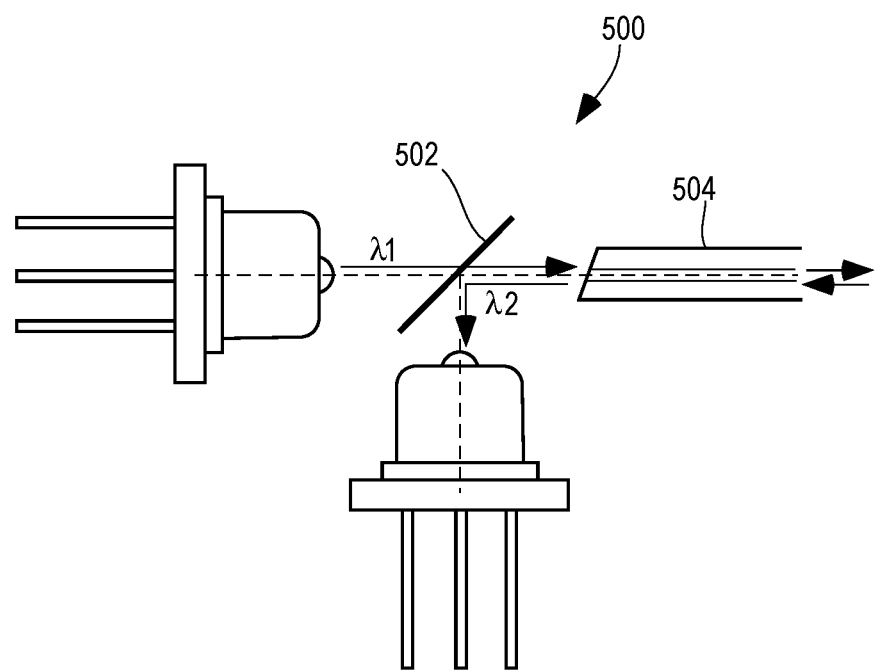
FIG. 5 is a diagram of a fiber optic assembly comprising wavelength division multiplexer splitters.

Regarding FIGS. 4 and 5, optical signals having different frequencies (A, B) can be focused into the fiber optic system 400 using wavelength division multiplexers 402, 404. Such systems may include a splitter interface (shown in FIG. 5) to inject the two optical signals into the fiber optic core 406 which may also include a fiber optic rotary joint 408. The active opto-electronic components can be laser diodes or LED's. For the current state of the art, Wavelength Division Multiplexing (WDM) occurs at between the wavelengths from about 1528 to 1563 nm. These optical frequencies are spaced about 100 GHz apart and are driven by optical amplifiers manufactured with Erbium doped materials to generate this band of optical frequencies. In practice, typically only two or three optical frequencies may be used over the same fiber optic link for communications. Of the two frequencies that are selected, generally one optical frequency is used for the transmit (Tx) function and the other optical frequency is used for the receive (Rx) function to achieve full duplex communications over the same optical fiber.

Referring to FIG. 5, a fiber optic system 500 includes a wavelength division multiplexer splitter 502 is used to divert light received from a multi-mode fiber optic core 504 having a first wavelength λ1 from light having a second wavelength λ2.

Figure 6:
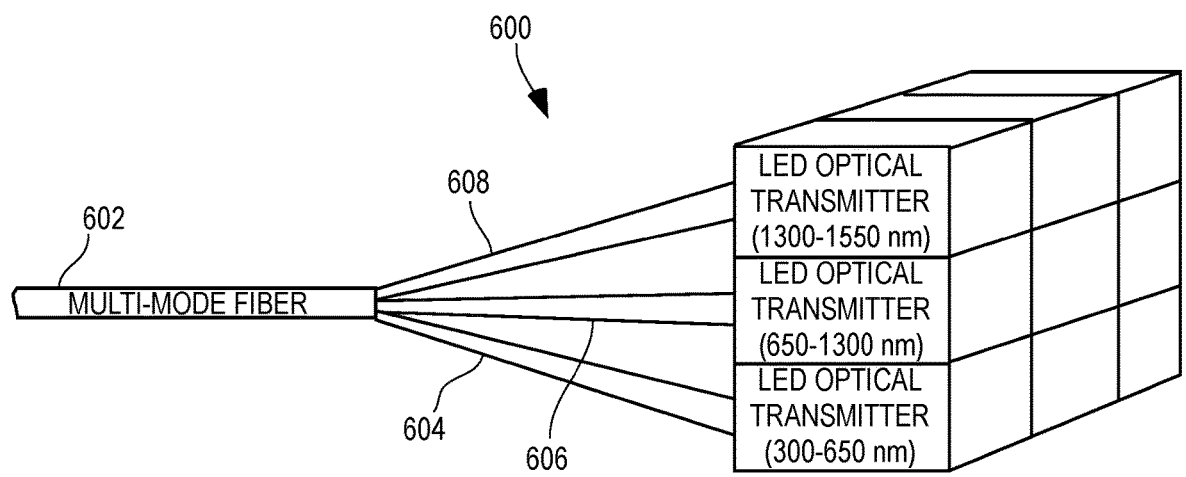
FIG. 6 is a diagram showing transmission of multiple optical signals in a multi-mode optical fiber link.
Figure 7:
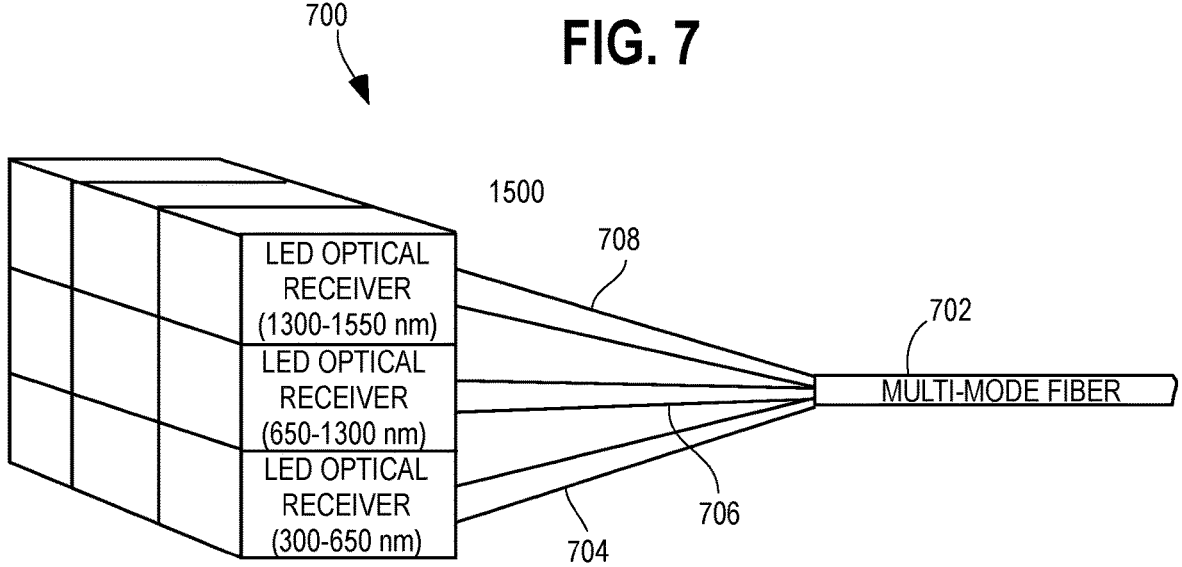
FIG. 7 is a diagram showing reception of multiple optical signals from a multi-mode optical fiber link.

FIGS. 6 and 7 show a method for transmission and reception of broadband optical signals via a "bug eye" or multi-faceted optical implementation of multiple optical frequencies into a single fiber optic link. FIGS. 6 and 7 show the integration of multiple light sources operating over the 300 to 1550 nm band of optical wavelengths. Wavelength division multiplexing allows the fiber optic system 600 to focus the different optical frequencies into the single fiber optic link (multi-mode fiber optic 602). In the illustrated embodiment, the range of optical frequencies includes 300-650 nm 604, 650-1300 nm 606, and 1300-1550 nm 608. FIG. 7 shows a fiber optic system 700 adapted to receive different optical frequencies of light (such as an LED, laser or other source of coherent light) from a multi-mode fiber optic core 702. In the illustrated embodiment, the ranges of optical frequencies include 300-650 nm 704 to a first LED optical receiver, 650-1300 nm 706 to a second LED optical receiver, and 1300-1550 nm 708 to a third LED optical receiver.

Figure 8:
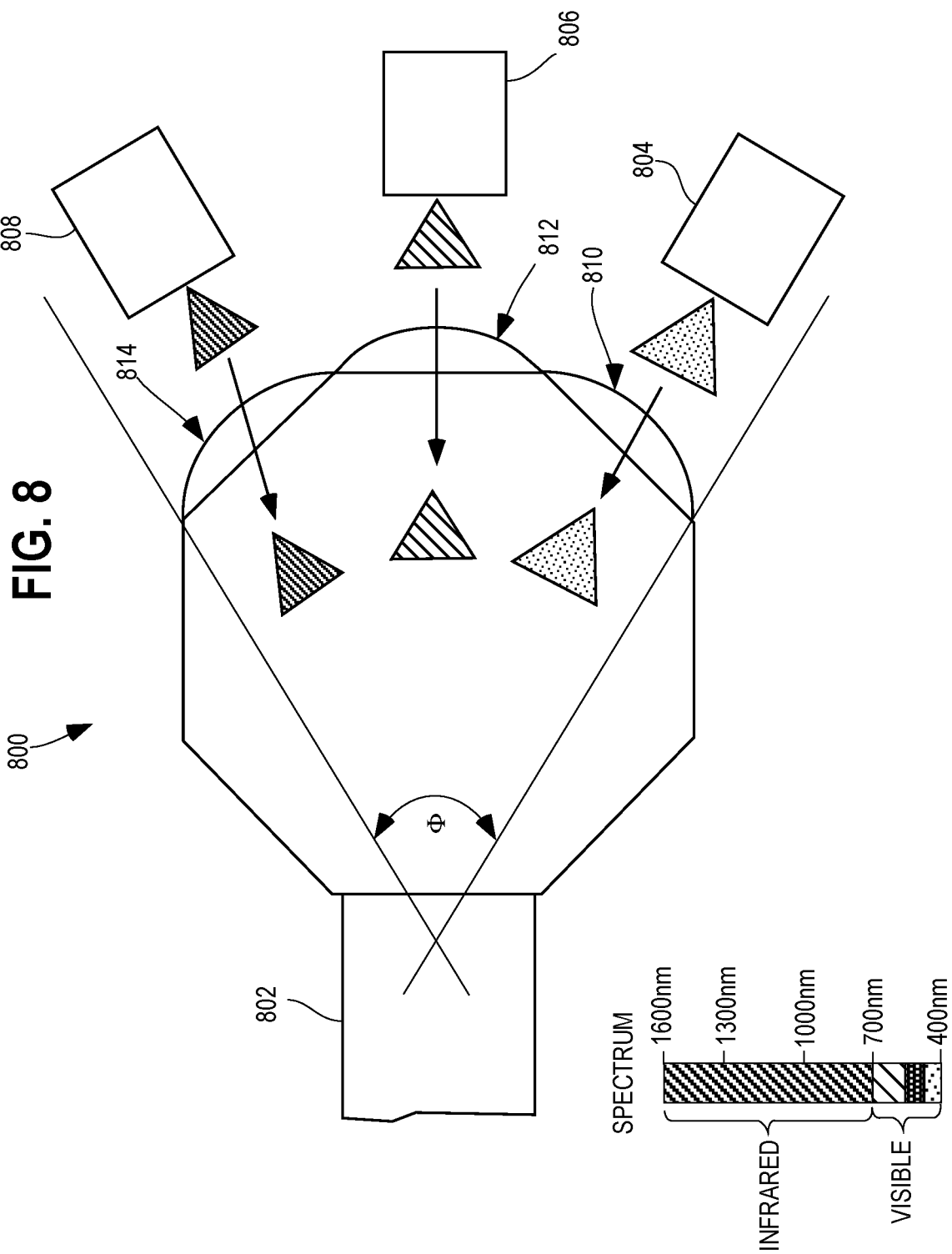
FIG. 8 is a diagram showing an optical interface in accordance with some embodiments of the instant disclosure.

FIG. 8 shows an optical interface 800 that is optically connected to the face of the multi-mode fiber 802 core. FIG. 8 notes an angle Φ at the entrance of the fiber optic core. This is the acceptance angle of the fiber optic core. Optical signals that are within this angle of incidence can be transmitted into the core of the fiber optic core and will propagate down the core with different optical frequencies. In this embodiment, three optical transceivers 804, 806, 808 are located around the optical interface 800. A reciprocal configuration can be used for signal reception as well, which includes one or more WDM splitters and optical transducers. These optical sources are then focused into the acceptance angle of the fiber optic link and form a much wider spectrum of light to enable optical frequency hopping.

In the illustrated embodiment the optical interface 800 comprises three spherical lenses 810, 812, 814, which are provided to transmit data signals from three LED optical transceivers 804, 806, 808. The first spherical lens 810 is configured to accept light having wavelengths between about 300 nm and about 650 nm from the first LED optical transceiver 804. The second spherical lens 812 is configured to accept light having wavelengths between about 650 nm and about 1300 nm from the second LED optical transceiver 806. The third spherical lens 814 is configured to accept light having wavelengths between about 1300 nm and about 1550 nm from the third LED optical transceiver 808.

As shown in FIG. 8, the first LED optical transceiver 804 transmits light at about 450 nm, the second LED optical transceiver 806 transmits light at about 650 nm, and the third LED optical transceiver 808 transmits light at about 1300 nm. A graphical representation of the optical spectrum is shown in FIG. 8 to illustrate that one or more of the LED optical transceivers (such as 804 and 806) can transmit visible light, while other LED optical transceivers (such as 808) can transmit infrared light into the multi-mode cable 802. In the illustrated embodiment, the second LED optical transceiver 806 can transmit visible light or infrared light.

In an alternative embodiment, the optical interface 800 could have a larger number of spherical lenses corresponding to a larger number of optical transceivers.

Since the network is comprised of multi-mode fiber optic cable, there are several challenges that need to be overcome. When an attack is detected, the communication frequency can be changed according to a set of communication band instructions that may include a predefined "frequency change list," which all connected devices have stored locally in memory of their secure hardware. The change of frequency can take on different modes of operation as well. For example, the system may change frequency every communication cycle or periodically at pre-determined intervals. Preferably, communication band instructions comprise a listing of a plurality of bands between about 300 nm and about 1550 nm.

Detection of a cyber attack is achieved by a detection of abnormal signal characteristics. Abnormal signal characteristics include lower or higher than normal amplitude, attenuated signals, a change in polarization of signals, or data that does not match a redundant signal. The processors of the core processing nodes (the I/O module and the computation module) are configured to sense such abnormal signal characteristics and initiate a response.

Another mode of frequency hopping to avoid cyber attacks is to change from a first frequency to a second frequency per the defined list of communication band instructions once when an attack is sensed and not changing the frequency until another attack is detected. The flow chart in FIG. 9 below shows an example of how this logic flow may function, namely a novel implementation for broadband frequency changes that can be implemented over a wider portion of the electromagnetic spectrum. For instance, light in the visible spectrum (400-700 nm) is typically not utilized in fiber optic communications.

Figure 9:
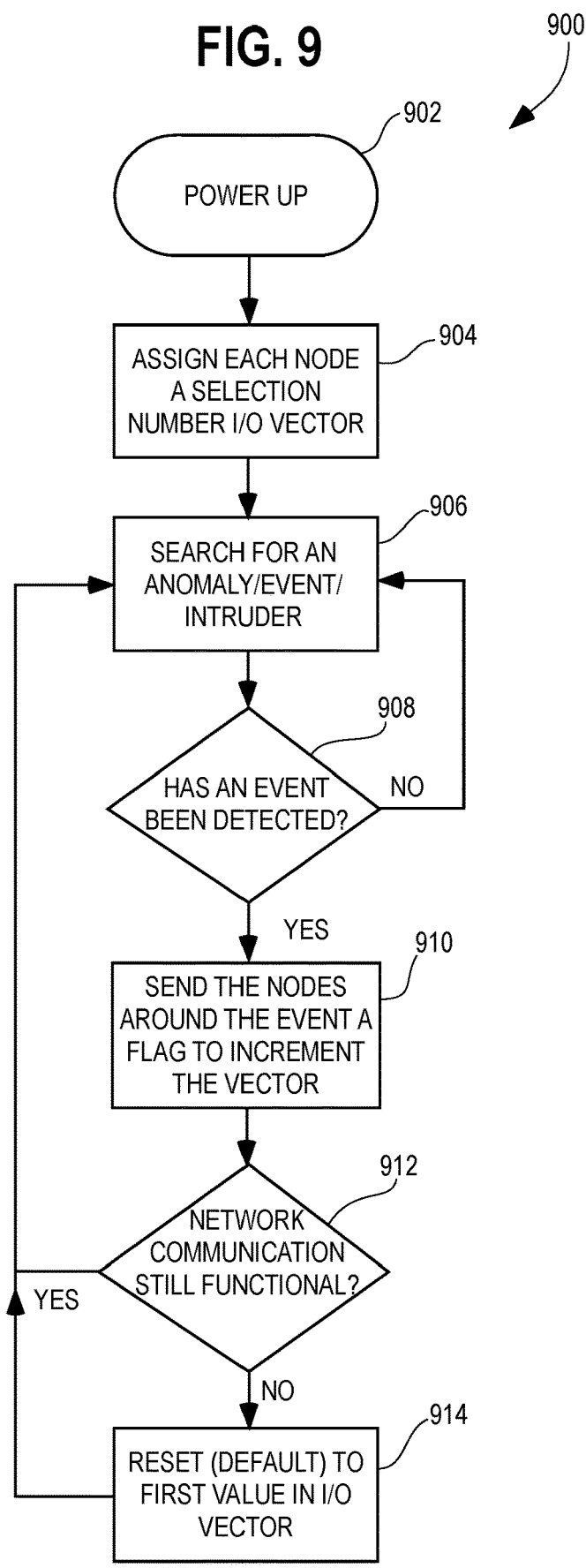
FIG. 9 is a flow chart illustrating a response to a sensed cyber attack.

Regarding FIG. 9, the control logic and selection of the transmission frequencies and communication links are encoded in the engine control unit. If the control unit detects a system intrusion, the control unit adaptively changes the transmission frequencies and communication links to re-encrypt the secure controls and communications. Preferably, the master node of the communication network is the computation module as it is in an off-engine location and has a higher processing power than the I/O module.

In the illustrated embodiment, the cyber attack response method 900 includes a power up step 902. The method assigns each node a Selection Number I/O Vector 904 which corresponds to a frequency stored in local communication band instructions. The cyber detection system then searches for a disturbance such as a cyber attack event or intrusion 906. The cyber detection system determines whether or not a cyber attack event has been detected 908. In the illustrated embodiment the cyber detection system checks for optical attenuation of a dedicated "guard" band. If no cyber attack event has been detected, the system continues to search for an anomaly/event/intruder 906. If an event is detected, the system sends the nodes a flag to increment the vector 910. This incrementing of the vector keeps the plurality of nodes on the same, new frequency. The system then determines whether network communications are still functional 912. If network communications are still functional, the system continues to search for an anomaly/event/intruder 906. If network communications are not functional, the system resets all nodes to the first Selection Number I/O Vector 914.

For example, the system could be pre-configured to shift communications or control parameters from 1500 nm to a new optical vector associated with a new security key for communications in the 1300 nm range for the system adaptation. In this embodiment the communication band instructions would instruct the nodes of the communication network to advance to an optical vector (Selection Number I/O Vector) stored in a local memory of each node of the plurality of nodes of the communication network. In this configuration, the cyber attack threat would be eliminated as the communication system transitioned to operation at another frequency within the much larger available wavelength from 300 to 1550 nm. The number of operating wavelengths would be limited by the number of different opto-electronic drivers interfaced with the fiber optic core.

In another embodiment, the communication band instructions would be transmitted from a master node such as the computation module or the I/O module to the other nodes of the communication network. Preferably, the master node is the computation module, comprising a processor (having a higher processing power than the processor of the I/O module), a network interface, and a local memory. Such communication band instructions could dictate a pseudorandom order to communications bands over a period of time (e.g., seconds, minutes, hours, or even days). In some embodiments, the communication instructions are transmitted over a dedicated band that outside of the range typically used in fiber optic communications (such as 500 nm, which is outside the normal range of 1350-1550 nm) or perhaps at a specific frequency that would typically serve as a guard band that exists between commonly used communication bands.

As noted above, the implementation of WDM in common fiber optic communication networks is typically limited to a narrow range of frequencies (from about 1528 nm to about 1563 nm) and still has inherent limitations to accommodate frequency hopping over a wider frequency spectrum with Erbium doped hardware. For cyber security purposes, this limited frequency band is susceptible as the transmission and reception hardware both have some overlapping sidebands for a hacker to gain access to the network communications such as eavesdropping or transmitting on a higher bandwidth to squelch out the real communications. Consequently with fiber optic communications, the frequency bands that have been used for WDM have narrowed the available bandwidth in the communication spectrum and the mitigation with the limits of this type of frequency hopping countermeasure are limited in scope. This system overcome those limitations and allows for use of multi-mode fiber optic communication system that is less susceptible to cyber attacks as the frequency hopping is over a wide frequency range from about 300 nm to about 1550 nm and the frequency instructions (communication band instructions) are stored in local memory of each node of the communication network.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the embodiments of the disclosure (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A distributed control system for a gas turbine engine, comprising:
    an input/output (I/O) module coupled to the gas turbine engine, the I/O module comprising:
        a first processor; and
        a first network interface device operably coupled to the first processor;
    at least one sensor operably coupled to the I/O module configured to provide a signal to the first processor, the signal based on sensed conditions of the gas turbine engine;
    at least one actuator operably coupled to the I/O module and controlled by the first processor; and
    a computation module comprising:
        a second processor with higher processing power than the first processor; and
        a second network interface device operably coupled to the second processor, wherein the second network interface device and the first network interface device are each one of a plurality of nodes on a communication network;
    wherein the communication network comprises multi-mode fiber optic cable,
    wherein the communication network is configured to operate at wavelengths between about 300 nm and about 1550 nm,
    wherein each node of the plurality of nodes comprises a plurality of optical transceivers and an optical interface,
    wherein the optical interface comprises a plurality of spherical lenses, and
    wherein the plurality of optical transceivers in each node of the plurality of nodes comprises at least a first LED optical transceiver that operates at a first wavelength, a second LED optical transceiver that operates at a second wavelength, and a third LED optical transceiver that operates at a third wavelength.

2. The distributed control system of claim 1, wherein each of the plurality of nodes comprises a wavelength division multiplexing splitter.

3. The distributed control system of claim 1, wherein the computation module is located remotely from the gas turbine engine.

4. The distributed control system of claim 1, wherein communication band instructions are stored locally in memory of the I/O module and the computation module.

5. A method of operating a communication network for a gas turbine engine, the method comprising:
    sensing, by at least one sensor, conditions of the gas turbine engine and providing signals to a first processor, the first processor operably coupled to a first network interface device;
    operating a second processor that has higher processing power than the first processor, wherein a second network interface device is operably coupled to the second processor, wherein the second network interface device and the first network interface device are each one of a plurality of nodes of a communication network between the first processor and the second processor, wherein each node of the plurality of nodes comprises a plurality of optical transceivers and an optical interface, wherein the optical interface comprises a plurality of spherical lenses, wherein the plurality of optical transceivers in each node of the plurality of nodes comprises at least a first LED optical transceiver that operates at a first wavelength, a second LED optical transceiver that operates at a second wavelength, and a third LED optical transceiver that operates at a third wavelength, and wherein the communication network comprises multi-mode fiber optic cable; and transmitting data from the first network interface device to the second network interface device according to communication band instructions, wherein the communication band instructions comprise a listing of a plurality of bands between about 300 nm and about 1550 nm, and wherein transmitting data comprises utilizing the optical interface.

6. The method of claim 5, further comprising the step of receiving the communication band instructions sent from a master node of the communication network, wherein the master node comprises the second processor and the second network interface device.

7. The method of claim 5, further comprising the step of storing the communication band instructions in a local memory of each of the plurality of nodes of the communication network.

8. The method of claim 5, further comprising the step of transmitting the communication band instructions on a dedicated band.

9. The method of claim 8, wherein the dedicated band operates at a wavelength of about 500 nm.

10. The distributed control system of claim 1, wherein each respective lens of the plurality of spherical lenses is configured to accept light from a respective optical transceiver of the plurality of optical transceivers.

11. The distributed control system of claim 1, wherein the optical interface further comprises:

a first spherical lens configured to accept light having wavelengths between about 300 nm and about 650 nm from the first LED optical transceiver;

a second spherical lens configured to accept light having wavelengths between about 650 nm and about 1300 nm from the second LED optical transceiver; and a third spherical lens configured to accept light having wavelengths between about 1300 nm and about 1550 nm from the third LED optical transceiver.

* * * * *